Oct. 8, 1963  J. W. HARRISON ETAL  3,106,441
METHOD OF MAKING PREFORMS OR BLANKS FROM POLYETHYLENE
Filed Jan. 4, 1960  3 Sheets-Sheet 1

INVENTORS
JOHN W. HARRISON
ROBERT D. LOWRY
WILLIAM G. BAIRD, JR.
ROBERT G. SHAVER
BY Cushman, Darby & Cushman
ATTORNEYS Oct. 8, 1963  J. W. HARRISON ETAL  3,106,441
METHOD OF MAKING PREFORMS OR BLANKS FROM POLYETHYLENE
Filed Jan. 4, 1960  3 Sheets-Sheet 2

INVENTORS
JOHN W. HARRISON
ROBERT D. LOWRY
WILLIAM G. BAIRD, JR.
ROBERT G. SHAVER
BY Cushman, Darby & Cushman
ATTORNEYS Oct. 8, 1963    J. W. HARRISON ETAL    3,106,441
METHOD OF MAKING PREFORMS OR BLANKS FROM POLYETHYLENE
Filed Jan. 4, 1960    3 Sheets-Sheet 3

INVENTORS
JOHN W. HARRISON
ROBERT D. LOWRY
WILLIAM G. BAIRD, JR.
ROBERT G. SHAVER
BY Cushman, Darby & Cushman
ATTORNEYS United States Patent Office 3,106,441
Patented Oct. 8, 1963

3,106,441
METHOD OF MAKING PREFORMS OR BLANKS FROM POLYETHYLENE
John W. Harrison, Robert D. Lowry and William G. Baird, Jr., Winchester, Mass., and Robert G. Shaver, Burke, Va., assignors to W. R. Grace & Co., Cambridge, Mass., a corporation of Connecticut
Filed Jan. 4, 1960, Ser. No. 406
1 Claim. (Cl. 18—47.5)

The present invention relates to a method of making containers or vessels of desired shapes from irradiated polyethylene preforms as well as a method of making the irradiated polyethylene preforms. The present invention also relates to a method of utilizing irradiated polyethylene preforms to provide a seal for a package.

The use of polyethylene in the making of all sorts of containers is well known as the polyethylene can be molded, stretched, shrunk or fused by heat. This type of material has been used to make containers for packaging articles such as food products or the like wherein the products are placed in the container and then the container is shrunk by the application of heat. Other types of containers made from polyethylene have been used as liners for rigid containers wherein the polyethylene containers were placed in the rigid container and gathered about the porduct and tied. Additional use of polyethylene has been made to make containers for the packaging of products such as liquids or powders wherein the opening of the container is closed by a thermal seal or by a screw-type cap. Even balloons have been made from polyethylene, the balloon being formed in a container shape. Therefore, the use of the word "container" in this specification is to be broadly construed for any vessel, bag, box, carton or the like having an opening therein which may be closed, regardless of the use of the vessel.

In the forming of containers from polyethylene, it has been found that it is difficult to subsequently shape the container to a desired shape as the polyethylene is very weak when hot. This difficulty in the forming of polyethylene containers is especially apparent where the containers have been provided with thermal seals, such seals being insufficiently strong to withstand the bilateral stretching or inflation of the container by fluid pressure when the container is heated.

Accordingly, an object of the present invention is to provide a method of making polyethylene containers to a desired shape after the containers have been preformed.

Ancillary to the preceding object, it is an object of the present invention to provide a method for forming a polyethylene container to a desired shape without damage to the polyethylene or the thermal seals made in the container when the polyethylene is elevated to a softening temperature.

Still another object of the present invention contemplates a method for making an improved polyethylene container from a blank or preformed container, the container being shaped to its final form by use of fluid pressure applied to the interior of the container.

A further object of the present invention is to provide a method for making a polyethylene container from a preformed container or blank wherein the polyethylene is bilaterally stretched to a desired shape.

A still further object of the present invention is to provide a method for forming polyethylene containers from preformed containers or blanks, the preformed containers being collapsible and capable of being shipped in a knockdown state to a place wherein a container having the final desired shape is formed.

Another object of the present invention is to provide a method for making a seal for a substantially rigid container and its cover or its lid, the rigid container being provided with a polyethylene liner and closure disk.

These and other objects and advantages of the present invention will become more apparent in the following specification, claim and drawings in which:

Figure 5:
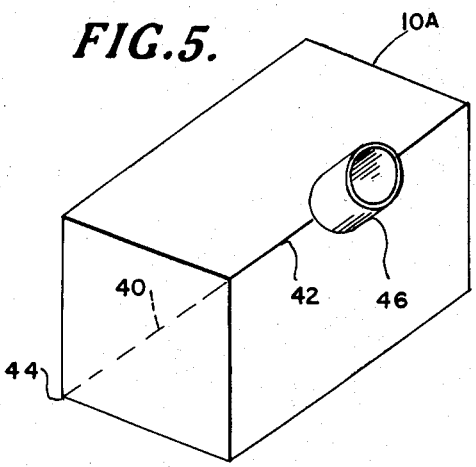
Figure 6:
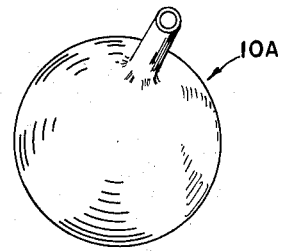
Figure 7:
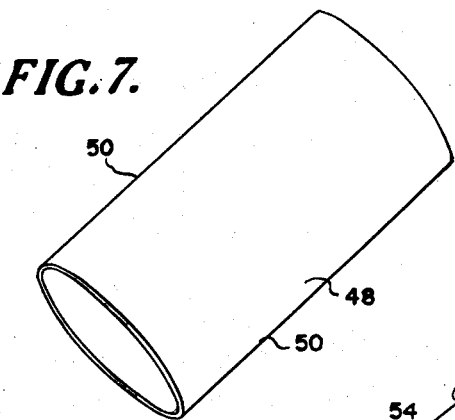
Figure 8:
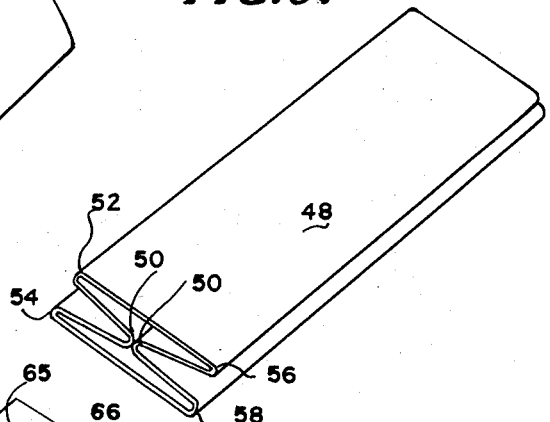
Figure 9:
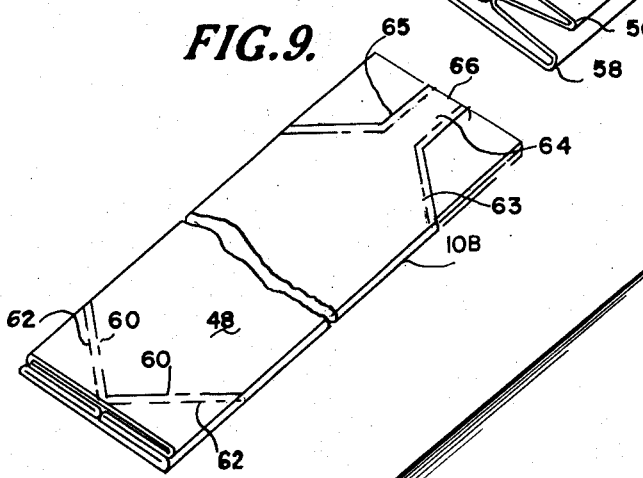
Figure 10:
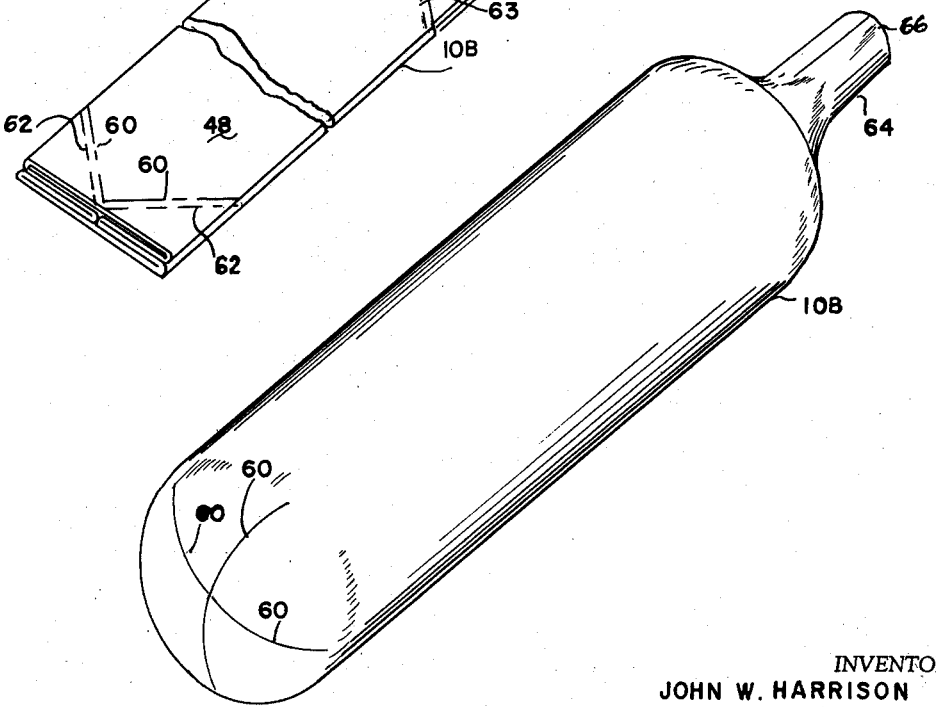
Figure 13:
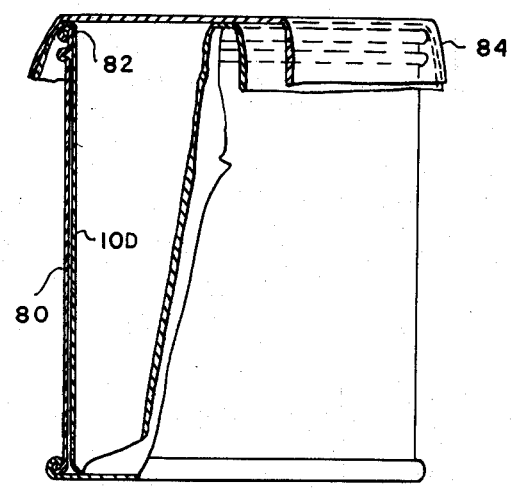
Figure 11:
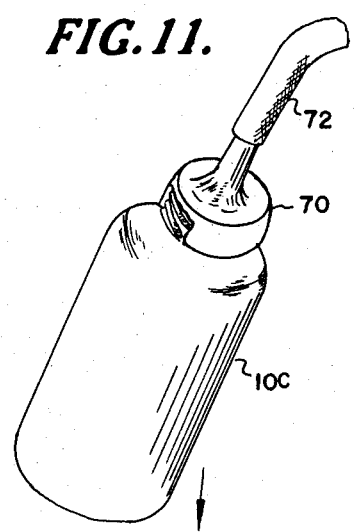
Figure 14:
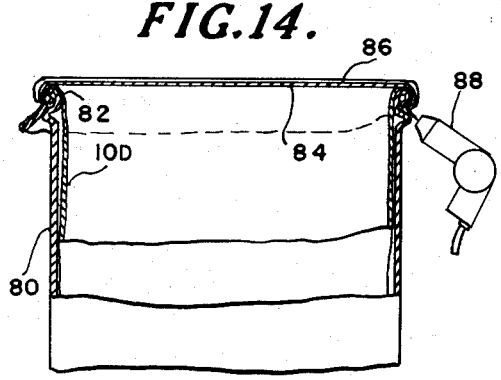
Figure 12:
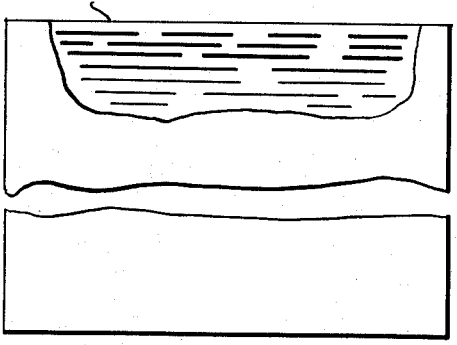
Figure 12:
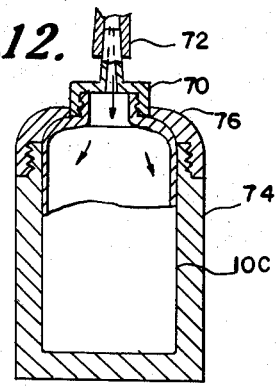
Figure 15:
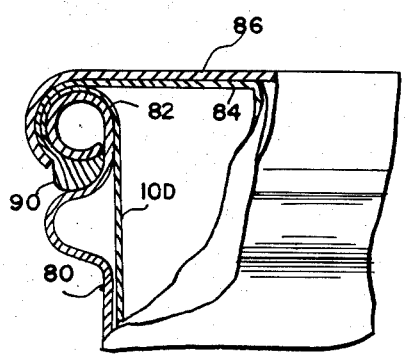

FIGURE 5 discloses a perspective view of a preformed polyethylene container prior to the container being shaped by the method of the present invention;

FIGURE 6 is a view of the preformed container of FIGURE 5 after the container has been formed to the desired shape, the figure being shown on a reduced scale;

FIGURES 7 through 9 are perspective views showing the successive steps of another method of making a preformed container from polyethylene tubing;

FIGURE 10 discloses a perspective view of the preformed container of FIGURE 9 after forming to a desired shape;

FIGURES 11 and 12 disclose successive steps of forming a preformed container or blank to its final desired shape;

FIGURES 13, 14 and 15 disclose successive steps of forming a seal between the lid and a rigid container such as a drum or the like when the container is provided with a polyethylene container type liner.

The present invention contemplates a method of making a preformed polyethylene container or blank and then forming the container or blank to a desired shape. Broadly, the method comprises making a preformed container 10 (FIGURE 3) from a roll of tubular polyethylene or from a sheet of polyethylene or molding the same and then after the preformed container or blank is made, the polyethylene is irradiated. After irradiation, the container 10 is heated to a temperature of 200 to 300° F. and while at this temperature the preformed container is then shaped by inflating the same within a mold or another vessel having the desired shape or by bilaterally stretching the container to a desired shape where the thickness of the preformed container is approximately 10 mils and the thickness of the finished container is approximately one mil. When the container has assumed its desired shape, it is maintained in this shape until it has cooled sufficiently to prevent shrinkage.

The heat shrinkable polyethylene employed was Alathon 14 (polyethylene, molecular weight about 20,000, density 0.916). More generally, the starting polyethylene employed may be high, low or medium density polyethylene prepared by high or low pressure techniques. The starting polyethylene can have a molecular weight of 7,000 or 12,000 or 19,000 or 21,000 or 24,000 or 35,000 or even higher.

After the preformed container or blank is made, the polyethylene of the container or blank is irradiated to an extent of 2 to 100 megarad, preferably 6 to 20 megarad. The irradiation can be accomplished in conventional fashion, e.g. by the use of a high voltage resonant transformer, such as the 2,000,000 volt General Electric resonant transformer, or high energy particle generators of 50,000 to 50,000,000 volts or a Van deGraaff electron generator. In addition to the use of electrons, there can be employed beta rays, gamma rays, e.g. by employing cobalt 60, etc. There can be employed any of the irradiation procedures disclosed in Baird et al. U.S. Patent 3,022,543, issued February 27, 1962, or Rainer Patent 2,877,500, for example. The entire disclosure of the Baird patent and the Rainer patent is hereby incorporated by reference.

After the preformed container or blank has been made and after it has been irradiated as heretofore described, its temperature was elevated to a range of 200 to 300° F. by immersing the preformed container in a bath of Carbowax 400 having a temperature within the aforementioned range. The container was immersed in the bath until it reached the softening or clear point and then the container was removed from the bath and immediately shaped to its final configuration. The temperature of the preformed container may also be elevated by inserting the container into a heated chamber where a heated gas is blown onto the container until it reaches the softening or clear point.

After the container had obtained the temperature within the range of 200 to 300° F., it was immediately shaped to its final configuration by the application of a fluid, such as air or the like, under pressure into the container so that the walls of the container were stretched from a 10 mil film to approximately a one mil film. If a particular shape of container was desired, the container was inserted into a vessel or mold having its interior with the desired shape and then the container was inflated until it assumed the shape of the vessels in which it was contained.

Once it had assumed the desired shape or desired size, the container was held in this shape or size until it had cooled sufficiently to prevent shrinking. The cooling could be accomplished at room temperature or could be accomplished by blowing cool gas across the container.

Figure 1:
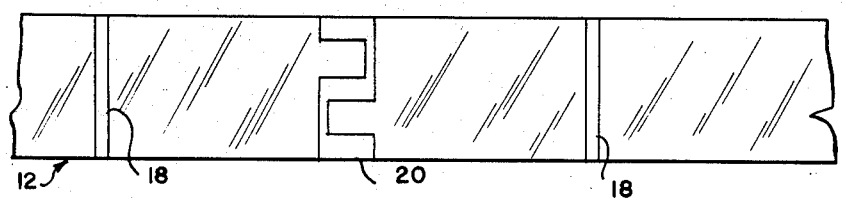
FIGURE 1 is a fragmentary view of a piece of polyethylene tubing after the tubing has been flattened out and the thermal seals have been made between the walls of the tubing.
Figure 2:
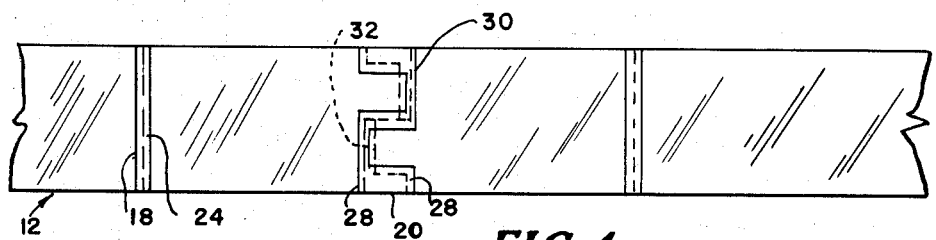
FIGURE 2 is a view substantially the same as FIGURE 1 but showing in dotted lines the position where the tubing is cut so that continuous preformed containers may be made.
Figure 4:
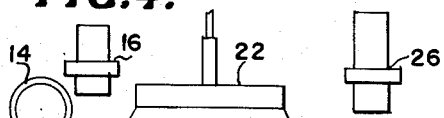
FIGURE 4 is a schematic illustration of the steps of making a preformed container or blank such as shown in FIGURES 1, 2 and 3.
Figure 3:
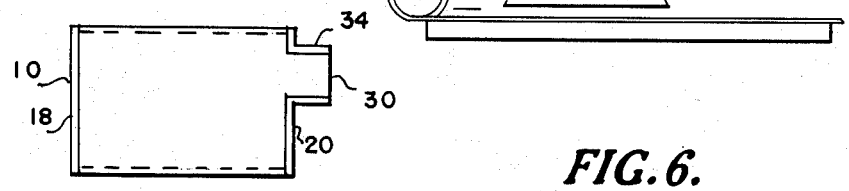
FIGURE 3 is a view of a container made from the tubing shown in FIGURES 1 and 2.

Referring now to the figures of the drawing, the specific examples of the present invention will hereinafter be described. In FIGURE 1, a tubular tape 12 of polyethylene is employed as the starting material. This tape usually comes in roll form and is fed from a roll 14 in a flattened form as shown in FIGURE 4. The tubular tape may be continuously fed beneath a sealing station represented by the numeral 16 wherein transverse heat or thermal seals 18 are made completely across the tape, the seals being spaced longitudinally of the tape 12. Intermediate each of the transverse seals 18 an S-shaped thermal seal 20 is also made at the heating station 16. The seals are continuously made as the tape 12 is fed from the roll 14 and after the seals have been made, the tape advances with the seals and is irradiated at a station indicated by the numeral 22. After irradiation of the tape and the seals, the transverse seals are cut along the dotted lines 24 (FIGURE 2) at the cutting station indicated by the numeral 26 in FIGURE 4 whereas the S-shaped seals are cut along the dotted lines 28. By providing an S-shaped seal completely across the tape as shown in FIGURE 2, when the seal is cut at the cutting station 26, an opening to the inside of one container is provided at 30 whereas an opening for the adjacent container is provided at 32. The containers 10 which are successively made from the tape 12 have a preformed configuration as shown in FIGURE 3. It will be noted that this container is rectangularly shaped and is provided with the thermal seal 18 at one end whereas the other end is provided with the thermal seal 20 which includes a neck portion 34 having an opening 30. The two plies of the tubular tape 12 provide the walls of the container and lay substantially flat against one another.

As shown in FIGURE 3, the preformed container is ready for forming to its final configuration. This container may be shipped or stored in its collapsed or flat shape until such time it is desired to form the container to its final configuration. When it is desired to preform the container 10 to its final configuration, the container 10 is first immersed in a bath of Carbowax at a temperature in the range of 200 to 300° F. When the polyethylene container reaches the softening or clear point, it is removed from the bath and an air hose is inserted on the neck 34 of the container. The container is inflated until its wall thickness has reduced from approximately 10 mils to one mil. On the other hand, if the container 10 is to be made to a specific shape, it may be inserted into a mold or vessel having the desired specific shape and then inflated so as to fill out the mold. When the container has assumed the desired shape of the mold, it is then retained in this shape until it has cooled sufficiently to prevent shrinkage. This may be accomplished by maintaining the air pressure on the interior of the container while the container is still in the mold. The container is then cooled at room temperature or by cool air blown across the mold.

Additionally, the container 10 may be bilaterally stretched to a desired configuration by use of a method of treating plastics such as disclosed in the application of Baird et al. Patent 3,022,543.

FIGURE 5 discloses another form of container 10A known commercially as a "Cubitainer" and which is formed from two half cubes vacuum drawn from heavy polyethylene sheet and thermally sealed together along the broken diagonal line 40 and the two opposite edges 42 and 44 of the half cubes. An open neck 46 is provided in one of the sealed edges. A container such as 10A is irradiated as heretofore described and after irradiation it may be blown to larger dimensions and to specific shapes once its temperature has been elevated to the range of 200 to 300° F.

FIGURE 6 shows a perspective view of the container 10A after it has been blown to the shape of a balloon. FIGURE 6 is on a reduced scale as compared to FIGURE 5. Where the example in FIGURE 6 shows the container 10A as a balloon, it is, of course, within the scope of the invention that the preformed container 10A could be placed in a mold or vessel of any desired shape, heated and then inflated so that it would assume the shape of the interior of the vessel. This mold or vessel could be the same geometric shape as the container 10A but in larger dimension, in which case all of the surface areas of the container 10A would be stretched approximately an equal amount as the container 10A is inflated.

Special containers with reinforced areas or areas of varying thickness could also be made. For example, the end panel 45 of container 10A could be thicker than the side panels 47. After such a container is irradiated as heretofore described and blown to a larger dimension and to a specific shape, the final product will have corresponding areas with varying thickness.

FIGURES 7 to 10 disclose a further modification of forming preformed containers which may be subsequently stretched into containers having larger dimensions and/or various shapes. Referring to FIGURE 7, a piece of tubular polyethylene tape is shown as indicated at 48. The tape is flattened so that it is provided with longitudinal edges 50. The tape 48 in FIGURE 7 is turned inside out as shown in FIGURE 8 and is pressed flat so that the edges 50 form inverted pleats touching one another. In effect, the inverted pleats provide four separate fins indicated at 52, 54, 56 and 58. One end of the tape 48, after it has been inverted as shown in FIGURE 8 is provided with thermal seals 60 (FIGURE 9) on the fins 52, 54, 56 and 58 extending at about a 45° angle toward the central axis of the tape. The end having the thermal seals 60 is cut along the seals as indicated at 62 so as to provide a substantially pointed end. While the seals 60 have been shown as straight, they could also be curved if suitable curved sealing bars are available. The other end of the tube 48 is sealed and cut in a similar manner except that the sloping seals 63 terminate short of the longitudinal axis of the tape and extend parallel as indicated at 65 so as to provide a neck 64 for the preformed container 10B. An opening 66 is provided in the neck 64 so that the preformed container 10B can be completed to a desired size or shape after it has first been irradiated as heretofore described and then heated to a temperature in the range of 200 to 300° F.

A preformed polyethylene container which has been fabricated by heat sealing sheets of film and subsequently irradiated has exhibited greatly improved seal strength over similar polyethylene containers not irradiated. It has been observed that a conventional seal produced by conventional impulse sealer type equipment and two sheets of irradiated 3 mil thick polyethylene will fail at 6 to 8 ozs. per linear inch at 100° C. Irradiation of the seal area to the extent of 20 megarads will increase this value to from 24 to 32 ozs. per linear inch at 100° C., and the seal failure was by the break of the film adjacent to the seal.

FIGURE 10 discloses the preformed container 10B after it has been blown to a balloon of larger dimension.

As heretofore described, a preformed polyethylene container after it has been irradiated may be blown to a desired shape in a mold after it has been heated to its softening or clear point without damage to the thermal seals or the side walls of the same. In FIGURE 11, an irradiated preformed container 10C which is shown in the shape of a small bottle is provided with a threaded nozzle cap 70 to which is attached an air hose 72. The preformed container 10C is immersed in a bath 74 of Carbowax at a temperature of 200 to 300° F. and remains in the bath until it has reached its softening or clear point which usually falls within the above-mentioned temperature range. The container 10C is immediately withdrawn from the bath and inserted into a mold 74 having a detachable cap 76. Air is applied under pressure through the hose 72 to the interior of the preformed container 10C so that the container is blown up to the shape of the interior of the mold 74. As shown in FIGURE 12, which is on a reduced scale from the disclosure in FIGURE 11, the container 10C has already assumed the shape of the mold 74. As soon as the container assumes the shape of the mold 74, the pressure of the fluid being applied through the hose 72 is maintained on the container and the container is cooled at room temperature or by blowing cold air over the mold. After the container has cooled sufficiently to prevent shrinkage of the same, it can be removed from the mold.

FIGURES 13 through 15 disclose a further environment of the present invention wherein the preformed container 10D made from polyethylene is subsequently irradiated so as to strengthen any thermal seals as well as the material itself, heated to its softening or clear point, and shaped to a desired configuration. In this instance, the container 10D is shaped to the configuration of a drum 80 as it is to be used as a liner for the drum. If desired, the container can be shaped in the drum 10D according to the method as heretofore described. The container 10D which provides a polyethylene liner for the drum 80 has its open end extending over the lip 82 of the drum and is folded downwardly as shown in FIGURE 13. A polyethylene disk 84 is inserted over the lip of the drum and folded downwardly in a substantially contiguous relationship with the edge of the polyethylene liner 10D. Of course, the disk 84 has a diameter greater than the diameter of the drum and is inserted onto the lip of the drum after the drum is filled with a desired material. A lid 86 is clamped onto the lip of the drum 80 and it will be noted that in FIGURE 14 that the edges of both the disk 84 and the liner or preformed container 10D extend out from between the lid 86 and the drum 80 adjacent the lip 82.

The preformed container 10D may be made from polyethylene film which has previously been irradiated so as to strengthen the material. The container 10D can be fabricated to fit the drum 80 and inserted therein, and the polyethylene disc 84 placed over the lip of the drum and the lid 86 clamped in place as noted above. In many applications the seals used in fabricating the container 10D will have sufficient strength and will not require irradiation to strengthen the seal area. In place of the irradiated polyethylene there can be employed heat shrinking film of irradiated or nonirradiated polypropylene to fabricate the preformed container 10D.

In order to provide an airtight seal, a suitable heater element such as a blower 88 is used to blow hot air against the two plies of polyethylene extending from between the lid 86 and the drum 80. The heat shrinkable characteristic or property of the polyethylene is utilized to form a sealing bead 90 as the excess material extending out between the drum 80 and lid 86 is shrunk back, forming a gasket-type seal between the lid and the drum. If the lid or cover does not fit well with the drum, the polyethylene being shrunk back will fill any clearances as the two layers of polyethylene are fused together and form a bead.

In accomplishing the desired results that are set forth in the objects and advantages of the present invention, and as described in detail in the foregoing description, it will be perceived and obvious that the invention is susceptible to some changes, and modifications without departing from the principle and spirit thereof. For this reason, the terminology used in the specification is for the purpose of description and not of limitation, the scope of the invention being defined in the claim.

What is claimed is:

A method of making a container of a desired shape which comprises the steps of: utilizing a tubular polyethylene tape which has been flattened, turning the tubular polyethylene tape inside out and then pressing flat so that the original edges of the flattened tape make inverted pleats, cutting the tape when in the flattened inverted position to provide an end for a preformed container having edges sloping toward the central longitudinal axis of the tape, cutting the other end of the tape so as to provide edges sloping toward one another and toward the longitudinal axis of the tape and then parallel to the longitudinal axis, thereby providing a neck portion for the preformed container, providing a thermal seal for each of the cut ends of the tape with an opening being left in the neck portion, irradiating the material of the preformed container to a dosage of at least $2 \times 10^6$ rad, elevating the temperature of the irradiated preformed container in the order of 200 to 300° F., forming the preformed container to the desired shape when at the elevated temperature and cooling the container while held in the desired shape.

References Cited in the file of this patent
UNITED STATES PATENTS

| | | |
|---|---|---|
| 2,315,478 | Parkhurst | Mar. 30, 1943 |
| 2,328,798 | Gardner | Sept. 7, 1943 |
| 2,348,738 | Hofmann | Mar. 16, 1944 |
| 2,588,604 | Archer | Mar. 11, 1952 |
| 2,608,334 | Knocke | Aug. 26, 1952 |
| 2,649,392 | Marshall | Aug. 18, 1953 |
| 2,764,862 | Rado | Oct. 2, 1956 |
| 2,811,818 | McCarty | Nov. 5, 1957 |
| 2,866,488 | Thompon | Dec. 30, 1958 |
| 2,872,763 | Meissner | Feb. 10, 1959 |
| 2,877,500 | Rainer | Mar. 17, 1959 |
| 2,937,481 | Palmer | May 24, 1960 |
| 2,976,655 | Dreyfus | Mar. 28, 1961 |

FOREIGN PATENTS

| | | |
|---|---|---|
| 444,815 | Great Britain | Mar. 27, 1936 |